United States Patent
Johnson et al.

(10) Patent No.: US 7,050,394 B2
(45) Date of Patent: May 23, 2006

(54) FRAMER

(75) Inventors: Erik J. Johnson, Portland, OR (US);
Don Newell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 10/323,400

(22) Filed: Dec. 18, 2002

(65) Prior Publication Data

US 2004/0123220 A1    Jun. 24, 2004

(51) Int. Cl.
*H04L 12/56* (2006.01)
*H04L 12/26* (2006.01)
*H04J 1/16* (2006.01)
*H04J 3/14* (2006.01)

(52) U.S. Cl. .................. 370/230.1; 340/3.21; 370/389; 370/395.52; 370/912

(58) Field of Classification Search ............... 340/3.21; 370/230.1, 389, 912, 395.52
See application file for complete search history.

(56) References Cited

U.S. PATENT DOCUMENTS

| 6,763,023 | B1* | 7/2004 | Gleeson et al. ............. 370/389 |
| 2003/0012374 | A1* | 1/2003 | Wu et al. ..................... 380/44 |
| 2003/0058870 | A1* | 3/2003 | Mizrachi et al. ....... 370/395.52 |
| 2004/0085953 | A1* | 5/2004 | Davis .................... 370/395.52 |
| 2004/0095934 | A1* | 5/2004 | Cheng et al. ................ 370/389 |
| 2004/0097199 | A1* | 5/2004 | Kawamura et al. ........... 455/91 |
| 2004/0151117 | A1* | 8/2004 | Charcranoon ............... 370/235 |
| 2005/0044365 | A1* | 2/2005 | Haukka et al. ............. 713/171 |

OTHER PUBLICATIONS

Tsern-Huei Lee et al.; Scalable Packet Digesting Schemes for IP Traceback; 2004 IEEE International Conference on Communications, vol. 2, Jun. 20-24, 2004; pp.: 1008-1013*
Tektroniz: SONET Telecommunications Standard Primer; 24 pages.
Wolf, et al: Design Issues for High-Performance Active Routers; IEEE Journal on Selected Areas in Communications, vol. 19, No. 3, Mar. 2001, 6 pages.
Intel IXB8055 UTOPIA/POS Reference Design, Intel Internet Exchange Architecture, 2001, 2 pages.
Intel: ATM/OC-3 to Fast Ehernet IP Router Example Design, Intel Internet Exchange Architecture, 2001, 4 pages.
Bay Microsystems, Inc.: Complex Tunnel Resolution for Today's Classification Problems, As Presented at the Communications Design conference, Sep. 2002, 8 pages.
Bergen et al: Streaming Interface (NPSI) Implementation Agreement, Revision 1.0 Network Processing Forum, (Continued)

Primary Examiner—R. Stephen Dildine
(74) Attorney, Agent, or Firm—Robert A. Greenberg

(57) ABSTRACT

A method includes extracting packets from within a received frame, generating digests of the extracted packets, and hashing the generated digests.

27 Claims, 3 Drawing Sheets

OTHER PUBLICATIONS

Streaming Interface Task Group, Oct. 18, 2002, 87 pages.

Iyer et al: ClassPI: An Architecture for Fast and Flexible Packet Classification, PMC-Sierra Inc., IEEE Network, Mar./Apr. 2001, 9 pages.

Intel: Intel IXP1200 Network Processor Family, Hardware Reference manual, Par No.: 278303-009, Dec. 2201, 272 pages.

Intel: IXF6048 Multi-Speed OC-1 to OC-48 IXF6012 Multi-Speed OC-1 to OC-12 SONET/SDH Cell/Packet Framers, product brief, 2000, 2 pages.

Intel: IX1200 Network Processor PPP Bridge Control Protocol Example Design, Application Note, Jun. 2001, 14 pages.

* cited by examiner

FRAMER

BACKGROUND

Communicating over a network often involves a variety of tasks. For example, to send content (e.g., a web-page, e-mail, streaming video, etc.) from one device to another, the content is typically divided into portions carried by different packets. An individual packet includes a payload that stores some portion of the content being sent and a header that includes data used in delivering the packet to its destination. By analogy, the packet's payload is much like a letter being mailed while the header stores information (e.g., a network destination address) that appears on the envelope.

Generally, before transmission, a framer maps one or more packets (or packet portions) into a logical organization of bits known as a frame. In addition to packet data, a frame often includes flags (e.g., start and end of frame flags), a frame checksum that enables a receiver to determine whether transmission errors occurred, and so forth. The framer feeds frame bits to one or more devices that generates signals to be carried over a network connection. For example, for an optic signal, the framer feeds a serializer/deserializer (SERDES) and transceiver that generates optic signals representing the digital data of a frame.

Processing a received frame generally proceeds in the reverse of the process described above. That is, a device physically receives signals over a network connection, determines bit values corresponding to the signals, and passes the bits to a framer. The framer identifies frames within the bit stream and can extract packets stored within the frames.

In network terminology, the components described above perform tasks associated with different layers of a network communication "protocol stack." For example, the bottom layer, often known as the "physical layer", handles the physical generation and reception of signals. The "link layer" includes tasks associated with framing. Above the physical and link layers are layers that process packets (the "network layer") and coordinate communication between end-points (the "transport layer"). Above the transport layer sits the "application layer" that processes the content communicated.

BRIEF DESCRIPTON OF THE DRAWINGS

DETAILED DESCRIPTION

Many devices perform packet classification to tailor subsequent processing of a packet. For example, based on packet characteristics, a packet may be given a particular quality of service (QoS), handled with a particular set of security features, or forwarded to a particular destination. The more sophisticated the classification, the more meaningful the packet processing that can occur. Unfortunately, classification can sometimes consume a significant amount of processing resources. As network connections reach and exceed 40-gigabits/second, a goal of processing packets without falling behind the rate at which they arrive ("wire speed") makes conservation of processor computing cycles an important consideration in system design.

Figure 1:
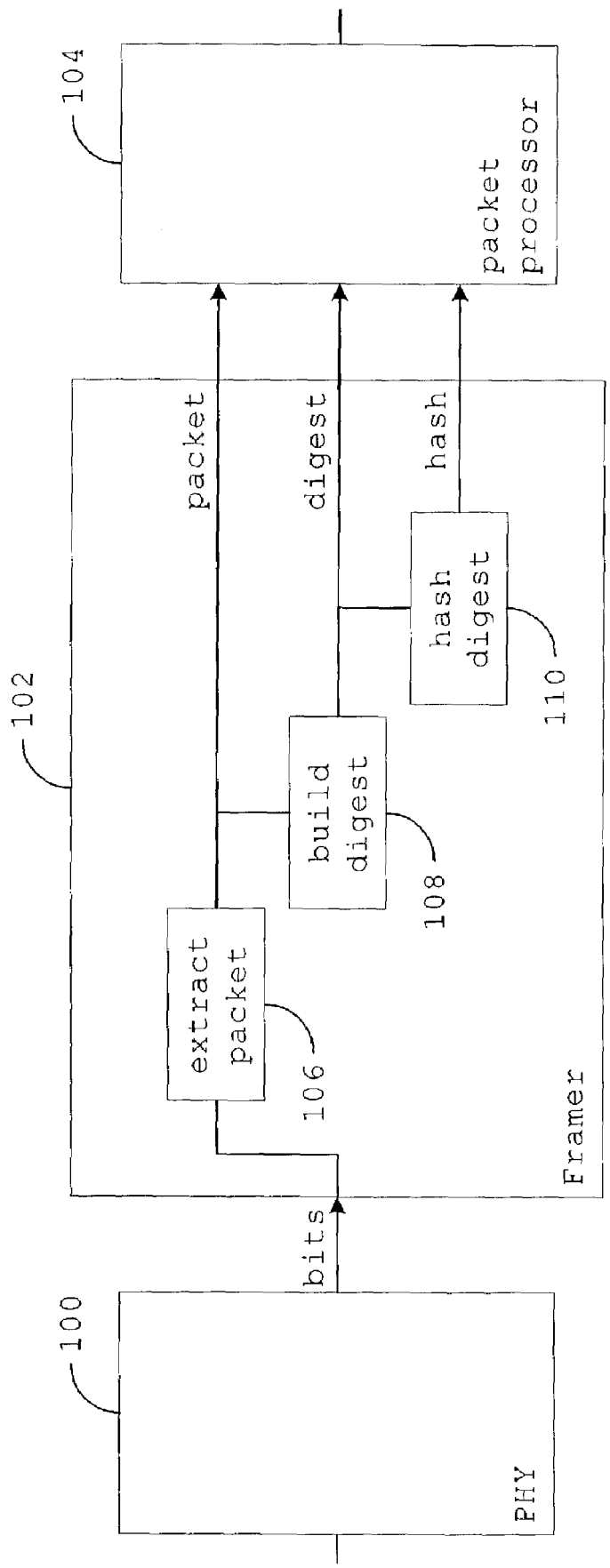
FIG. 1 is a block diagram illustrating logical operation of a framer that generates a packet digest.

FIG. 1 depicts a framer 102 that can potentially "off-load" certain operations in a packet classification process. As shown, the framer 102 includes logic that extracts 106 packets from identified frames and generates 108 digests of the packets. A packet digest can include a variety of packet characteristics such as data included in the packet's header(s) and/or payload. The framer 102 can provide this digest to a packet processing component 104 that can use the digest in classifying and/or processing the packet. In addition to generating a digest, the framer 102 may also include logic that computes 110 a hash of the digest. A hashing operation can translate the digest into a smaller piece of data that can speed classification table lookups. Thus, the packet processor 104 can use the hash to quickly determine packet processing operations to perform for a given packet.

The scheme illustrated in FIG. 1 can potentially enable the framer 102 to take on at least some of the burden of packet classification from other packet processing components 104. This can speed the process of classifying a packet and free a packet processor 104 to perform other operations. This, in turn, can potentially permit the system to maintain wire speed even as connection speeds increase. Though the framer 102 performs initial tasks in the classification process, the division of classification duties between the framer 102 and the packet processor 104 can lessen the complexity of framer 102 design and operation. That is, in the scheme shown, the framer 102 need not maintain a classification table or perform the memory accesses needed to lookup information within such a table. Other framer 102 designs, however, may include such features.

In greater detail, the sample system shown in FIG. 1 includes at least one physical layer component (PHY) 100 that interfaces to a network connection (e.g., a copper wire, optic cable, or wireless connection). For instance, the PHY 100 may interface to an Ethernet (e.g., 100 Mb/s Ethernet, FastEthernet, GigEthernet) or optical connection (e.g., OC-192,or OC-768 connection). These and other connections may reach and/or exceed 40-gigabits/second. The PHY 100 determines bit values associated with received signals and feeds the resulting bit-stream to the framer 102.

The framer 102 performs a variety of operations on the PHY 100 generated bit stream such as detecting frame boundaries, verifying frame checksums, bit unstuffing, and so forth. The framer 102 may be configured to handle a variety of frames such as an Ethernet frame, a High-level Data Link Control (HDLC) frame, or a Point-to-Point Protocol (PPP) frame.

The framer 102 also extracts packets from the frames. For example, in a Synchronous Optical Network/Synchronous Digital Hierarchy (SONET/SDH) compliant system, the framer 102 can extract packets from the data stored in a SONET frame's Synchronous Payload Envelope (SPE). In such a scheme, the data for a particular packet may be distributed across several frames. Thus, the framer 102 may buffer and accumulate a packet's data as it arrives piecemeal.

As shown, the framer 102 generates 108 a digest from the packet. The digest may vary based on a packet classification scheme being used. For example, the digest may concatenate a packet's source Internet Protocol (IP) address, destination IP address, transport protocol (e.g., Transport Control Protocol (TCP) or User Datagram Protocol (UDP)) from the packet's IP header with the source port, and destination port from a packet's transport header. Such a digest can be used in a scheme that classifies packets according to end-point to end-point communication flows. Other digests can include other data. For example, for an IPSec implementation the digest may feature the IP source and destination address, transport protocol, and security parameter. Additionally, the digest may include packet data other than data from the packet's header. For example, a digest may be formed from bytes of a Universal Resource Locator (URL) included within a packet's payload. Such a digest may be useful in a scheme that handles packets based on requested web-content. Further, a digest may include information not included within the packet (e.g., data from one or more previous packets, network status information, and so forth).

The digest can be generated by selectively shifting bits of the packet into a register as the packet bits are output by the framer. This enables the register to accumulate packet bits featured in the digest even though the bits may not be contiguous within the packet. When the framer outputs the final bit of the packet, the remaining register value constitutes the packet's digest.

In addition to logic that generates the packet digest, the framer 102 may also include logic 110 to hash the digest. The hash, generally, reduces the size of the digest, for example, to 16 or 32-bits. A hash operation may be selected for its distribution properties (e.g., the hashes ability to generate a uniform distribution of hash values for different digest values). For example, the hash may use a SHA-1 (Security Hash Algorithm-1) or MD5 (Message Digest version 5) algorithm. Since the hash may be used as a key to a classification table, the hash could result in immediate packet classification.

As shown, the framer 102 forwards extracted packets to packet processing logic 104 via an interface of the framer's. For example, the framer 102 may forward packets to the logic via a Serial Peripheral Interface (SPI), Universal Test and Operation PHY Interface (UTOPIA), Media Independent Interface (MII), Gigabit Media Independent Interface (GMII), or extended Attachement Unit Interface (XAUI) interfaces.

The packet processor 104 may process the packet in accordance with a network layer (e.g., IPv4 or IPv6) and/or transport layer protocol (e.g., TCP, UDP, or Real-time Transport Protocol (RTP)). For instance, the packet processor 104 may implement a routing algorithm to determine where to forward a packet. The packet processor 104 may perform other packet processing operations such as de/encrypting or de/encapsulating a packet.

As shown, in addition to the packet, the framer 102 also outputs (e.g., pushes or makes available for a pull) data based on the digest (e.g., the digest itself and/or the hash of the digest). Based on the digest and/or hash, the packet processor 104 can continue processing of the packet. For example, the packet processor 104 may use the hash as the key to a classification table. The classification table may indicate where to route a particular class of packets, which quality of service to apply, which security features to provide, and so forth. The packet processor 104 can then process the packet based on the results of the classification table lookup.

Potentially, the hash operation may yield the same hash value for different digests. This can cause a classification table "collision" (i.e., multiple digests map to the same classification entry). To identify the correct classification table entry for a packet in the event of a collision, the framer 102 may provide the packet processor 104 with the digest in addition to the digest's hash value.

Though described above as suited for use in conjunction with a classification table lookup, the packet processor 104 may use the digest and/or hash for other purposes. For example, the digest could speed a search for information in the payload, for instance, where the location of the information is not fixed with regard to the start of the packet. As an example, if the digest represents bytes of a Universal Resource Locator (URL), the digest could be searched for various keywords which indicate further processing (e.g., in a process for web-farm load balancing). The digest accelerates overall processing since the processing agent need not search the packet to find the information of interest. Additionally, the digest can speed processing because the smaller digest can likely reside in faster access memory than the packet itself.

The framer 102 logic may be implemented in a variety of ways. For example, the logic may be implemented exclusively in hardware, for example, as an integrated circuit, Application-Specific Integrated Circuit (ASIC), or Programmable Gate Array. Alternately, the logic may be implemented in firmware, software, or some combination of hardware, firmware, and/or software. The framer 102 may be integrated into a variety of network devices such as routers, switches, firewalls, line cards, network interface cards (NICs), or storage area network (SAN) components, among others.

Figure 2:
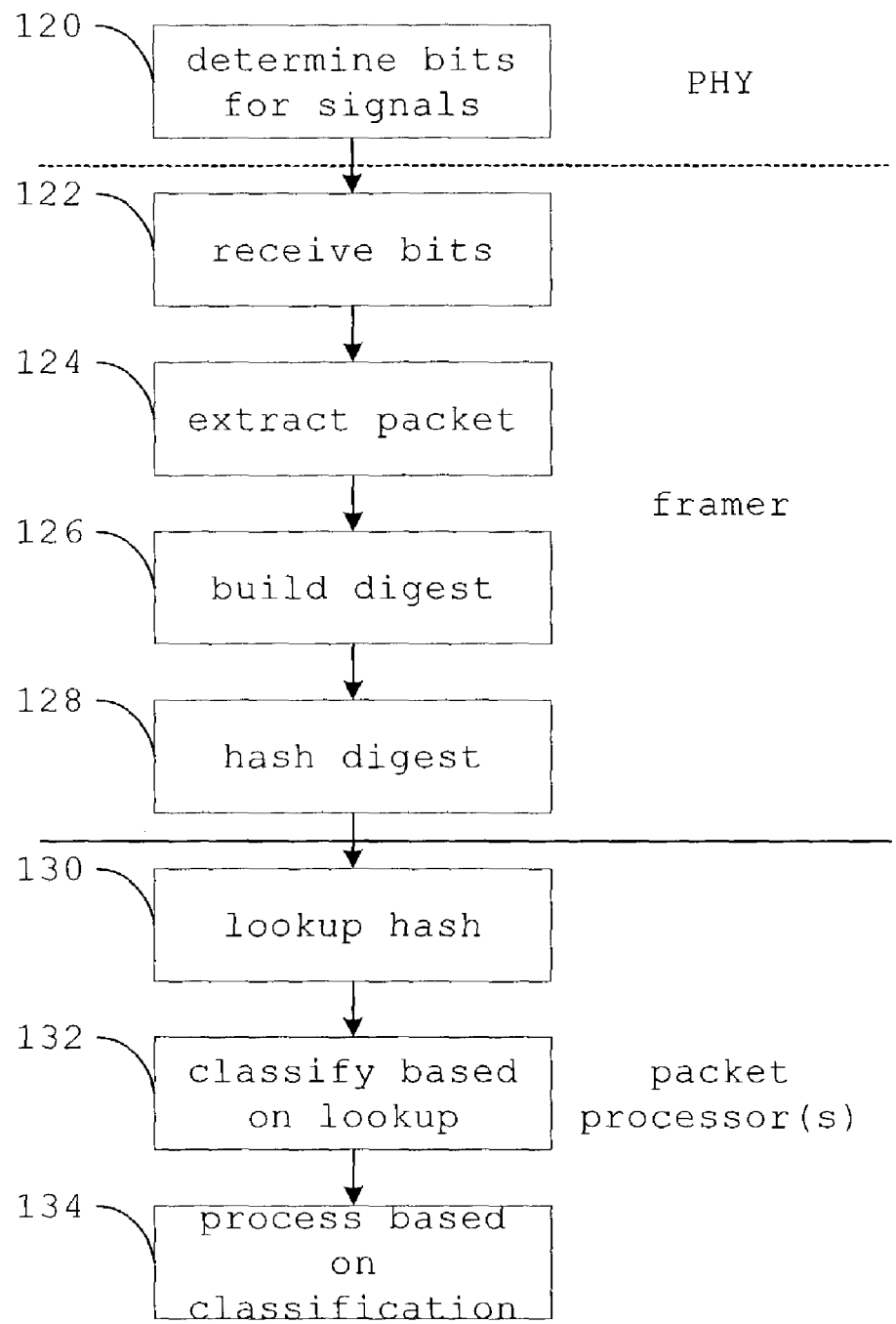
FIG. 2 is a flowchart illustrating operation of a system including a framer that generates a packet digest.

FIG. 2 illustrates sample operation of the system described above. As shown, a physical layer device feeds 122 a framer a stream of bits corresponding 120 to signals received by the device. The framer identifies frames in the bit stream and extracts 124 packets from the frames. From the packet, or during the extraction of the packet, the framer generates 126 a packet digest and may hash 128 the resulting digest. A packet processor can lookup 130 the digest and/or hash in a classification table and process 134 the packet based on the associated table data.

Figure 3:
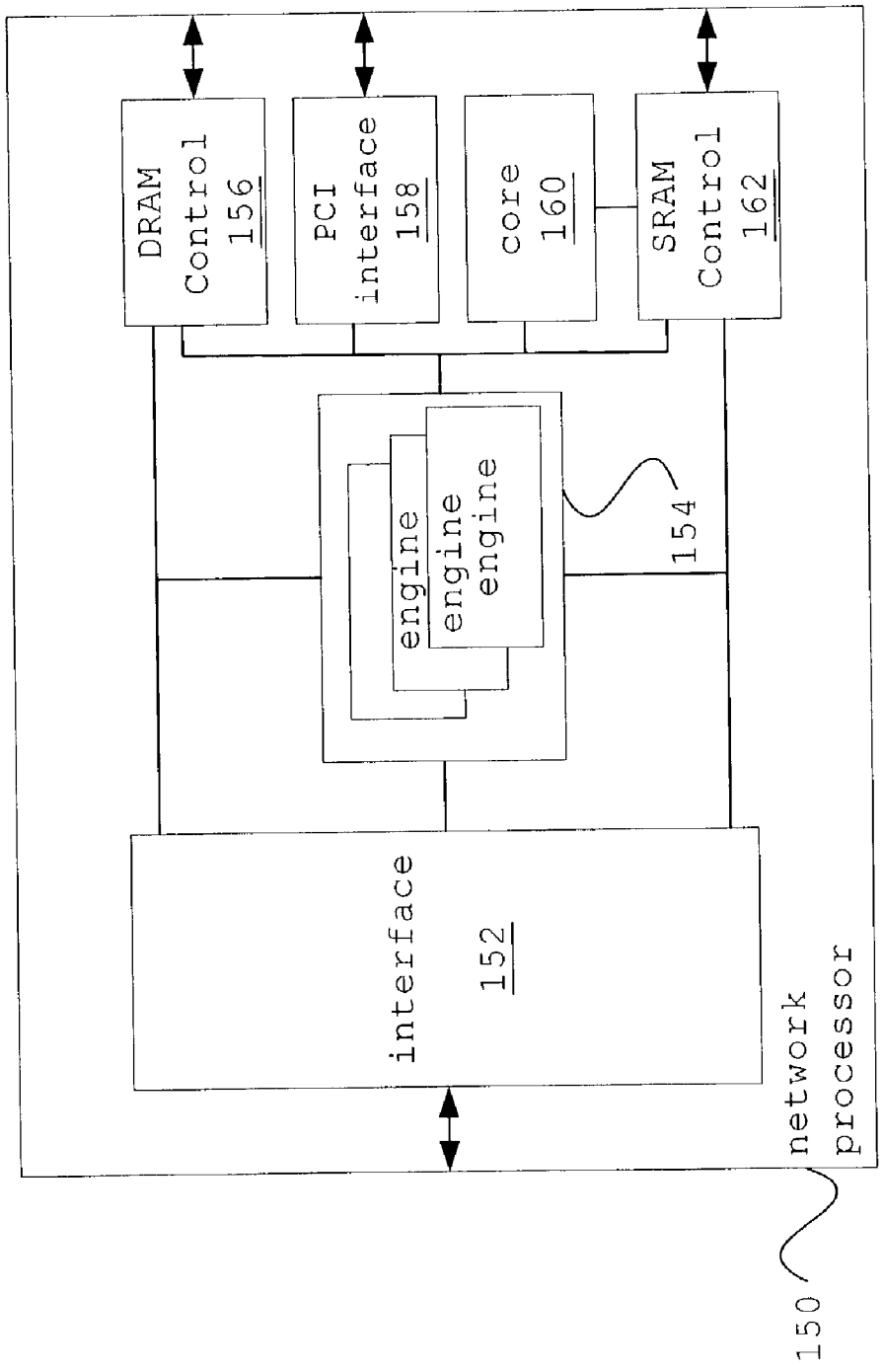
FIG. 3 is a diagram of a network processor.

The framer 102 may output the packet, digest, and/or hash to a variety of packet processing components 104. For example, the framer may forward the data to a Transmission Control Protocol/Internet Protocol (TCP/IP) off-load engine, a central processing unit (CPU), or Application-Specific Integrated Circuit (ASIC). Alternately, the framer 102 may forward data to a programmable device known as a network processor. FIG. 3 depicts an example of a network processor 150. The processor 150 shown is an Intel® Internet eXchange network Processor (IXP). Other network processors feature different designs.

As shown, the processor 150 features an interface 152 (e.g., an Internet eXchange bus interface) to a bus that carries packets and associated digest-based data generated by the framer. The bus may also connect to other components such as other network processors or a switch fabric (not shown). The processor 150 also includes an interface 158 for communicating with a host or other local devices. Such an interface may be a Peripheral Component Interconnect (PCI) type interface such as a PCI-X bus interface. The processor 150 also includes other components such as memory controllers 156, 162 that can provide access to memory that, for example, stores a classification table.

The processor 150 shown features a collection of packet processing engines 154 that can be programmed to lookup classification data for a packet based on the framer generated digest and/or hash. The engines 154 may also perform the appropriate packet processing operations. In the network processor 150 shown, the engines 154 are Reduced Instruction Set Computing (RISC) processors tailored for processing network packets. For example, the engines 154 do not include floating point instructions or instructions for integer multiplication or division commonly provided by general purpose central processing units (CPUs). Each of the engines 154 includes hardware supporting multi-threaded operation. The processor 150 also includes a core processor 160 (e.g., a StrongARM® XScale®) that is often programmed to perform "control plane" tasks involved in network operations. The core processor 160, however, may also handle "data plane" tasks and may provide additional packet processing threads.

Other implementations are within the scope of the following claims. For example, though described above as operating on Internet Protocol packets, the framer described above may similarly process Asynchronous Transfer Mode packets ("cells").

What is claimed is:

1. A method for use in processing a frame transmitted over a network, the method comprising:
  receiving bits at a framer;
  identifying, at the framer, at least one frame in the received bits;
  extracting, at the framer, a packet from the at least one identified frame(s); generating, at the framer, a digest of the packet from a subset of packet bits; and hashing, at the framer, the generated digest.

2. The method of claim 1, further comprising forwarding the packet to a packet processor via at least one of the following interfaces: a Serial Peripheral Interface (SPI), a Universal Test and Operation PHY Interface (UTOPIA), a Media Independent Interface (MII), a Gigabit Media Independent Interface (GMII), and an eXtended Attachement Unit Interface (XAUI).

3. The method of claim 1, wherein the generating a digest comprises concatenating non-contiguous packet bits.

4. The method of claim 1, wherein the digest comprises at least one of the following: a source address, a destination address, a source port, a destination port, a transport protocol, at least a portion of the packet's payload, and a security parameter.

5. The method of claim 4, wherein the digest comprises the source address, the destination address, the source port, the destination port, and the transport protocol.

6. The method of claim 4, wherein the digest comprises the source address, the destination address, the transport protocol, and a security parameter.

7. The method of claim 1, wherein extracting the packet comprises extracting the packet from at least one of the following: at least one Synchronous Payload Envelope (SPE) of at least one Synchronous Optical Network (SONET) frame, an Ethernet frame, a High-level Data Link Control (HDLC) frame, and a Point-to-Point Protocol (PPP) frame.

8. The method of claim 1, wherein receiving bits comprises receiving bits from a physical layer component (PHY).

9. The method of claim 1, further comprising:
  receiving, from the framer, the packet and at least one of: a packet digest and a hash of the packet digest;
  performing a table lookup using at least one of: the packet digest and the hash of the packet digest; and
  processing the packet based on the lookup results.

10. The method of claim 9, wherein the table stores at least one of the following: a destination for a class of packets, a quality of service for a class of packets, and a security policy for a class of packets.

11. The method of claim 9, wherein processing the packet comprises at least one of the following: processing the packet in accordance with a network layer protocol and processing the packet in accordance with a transport layer protocol.

12. The method of claim 9, wherein the receiving the packet comprises receiving the packet at at least one of the following: a network processor and a Transmission Control Protocol/Internet Protocol (TCP/IP) off-load engine.

13. A framer, comprising:
  at least one interface to at least one packet processor; and
  logic to:
    receive bits from at least one physical layer component (PHY);
    identify at least one frame in the received bits;
    extract a packet from the at least one identified frame;
    generate a digest of the packet from a subset of packet bits at the framer; and
    hash the generated digest.

14. The framer of claim 13, wherein the at least one interface comprises at least one of the following: a Serial Peripheral Interface (SPI), a Universal Test and Operation PHY Interface (UTOPIA), a Media Independent Interface (MII), a Gigabit Media Independent Interface (GMII), and an eXtended Attachement Unit Interface (XAUI).

15. The framer of claim 13, wherein the logic to generate a digest comprises logic to generate a digest from non-contiguous packet bits.

16. The framer of claim 15, wherein the logic to generate a digest comprises logic to selectively shift packet bits into a register.

17. The framer of claim 13, wherein the logic to generate a digest comprises logic to generate a digest that includes at least one of the following: a source address, a destination address, a source port, a destination port, a transport-layer protocol, at least a portion of the packet's payload, and a security parameter.

18. The framer of claim 13, wherein logic to identify the at least one frame comprises logic to identify at least one of the following: a Synchronous Optical Network (SONET) frame, an Ethernet frame, a High-level Data Link Control (HDLC) frame, and a Point-to-Point Protocol (PPP) frame.

19. A system, comprising:
  a physical layer component (PHY);
  a framer, the framer comprising:
    at least one interface to at least one packet processor, and
    logic to:
      receive bits from the PHY;
      identify at least one frame in the received bits;
      extract a packet from the at least one identified frame;
      generate at least a digest of the packet from a subset of packet bits and
      hash the generated digest; and
  at least one packet processor coupled to the framer to process the packet extracted by the framer received via the interface.

20. The system of claim 19, wherein the PHY comprises a PHY that receives signals via at least one of the following: a wire, optic, or wireless medium.

21. The system of claim 19, wherein the interface comprises at least one of the following: a Serial Peripheral Interface (SPI), a Universal Test and Operation PHY Interface (UTOPIA), a Media Independent Interface (MII), a Gigabit Media Independent Interface (GMII), and an eXtended Attachement Unit Interface (XAUI).

22. The system of claim 19, wherein the logic to identify at least one frame comprises logic to identify at least one of the following: a Synchronous Optical Network (SON ET) frame, an Ethernet frame, a High-level Data Link Control (HDLC) frame, and a Point-to-Point Protocol (PPP) frame.

23. The system of claim 19, wherein the packet processor comprises at least one of the following: a Transport Control Protocol/Internet Protocol (TCP/IP) off-load engine, a network processor, an Application-Specific Integrated Circuit (ASIC), and a central processing unit (CPU).

24. The system of claim 19, wherein the packet processor comprises logic to perform a packet classification table lookup based on at least one of: the packet digest and a hash of the packet digest.

25. A system, comprising:
at least one optical physical layer component (PHY) to receive signals transmitted over an optical network connection;
a framer, the framer comprising:
an input interface coupled to at least one optical PHY component;
an output interface to a packet processor; and
logic to:
receive bits at the input interface;
identify at least one Synchronous Optical Network (SONET) frame in the received bits;
extract a packet from at least one Synchronous Payload Envelope (SPE) of the at least one SONET frame;
assemble a digest of the packet from a subset of packet bits, the digest including at least an Internet Protocol (IP) source and destination address included in the packet's header;
hash the digest;
output at least the packet and the hash via the output interface, and
a network processor, the network processor comprising:
an interface coupled to the framer;
multiple Reduced Instruction Set Computing (RISC) processors;
memory accessible by the processors; and
instructions for causing at least one of the multiple processors to:
perform a lookup of a table stored in the memory using the hash of the digest; and
processing the packet based on the lookup.

26. The system of claim 25, wherein the digest consists of the IP source address, the IP destination address, a transport protocol, a source port, and a destination port.

27. The system of claim 25, wherein the output interface comprises at least one of the following interface: a Serial Peripheral Interface (SPI), a Universal Test and Operation PHY Interface (UTOPIA), a Media Independent Interface (MII), a Gigabit Media Independent Interface (GMII), and an eXtended Attachement Unit Interface (XAUI).

* * * * *